(12) United States Patent
Husni et al.

(10) Patent No.: US 7,453,516 B2
(45) Date of Patent: Nov. 18, 2008

(54) FLEXIBLE CAMERA LENS BARREL

(75) Inventors: Shazli Husni, Penang (MY); Gurbir Singh, Penang (MY)

(73) Assignee: Aptina Imaging Corporation, Grand Cayman (KY)

( * ) Notice: Subject to any disclaimer, the term of this patent is extended or adjusted under 35 U.S.C. 154(b) by 856 days.

(21) Appl. No.: 10/455,283

(22) Filed: Jun. 4, 2003

(65) Prior Publication Data
US 2004/0246370 A1   Dec. 9, 2004

(51) Int. Cl.
*H04N 5/225* (2006.01)

(52) U.S. Cl. ........................... 348/373; 348/375

(58) Field of Classification Search ................. 348/373, 348/375
See application file for complete search history.

(56) References Cited

U.S. PATENT DOCUMENTS

| | | | |
|---|---|---|---|
| 2002/0131782 A1* | 9/2002 | Yamaguchi et al. | 396/429 |
| 2003/0112364 A1* | 6/2003 | Tanida et al. | 348/375 |
| 2004/0017501 A1* | 1/2004 | Asaga et al. | 348/340 |
| 2004/0130656 A1* | 7/2004 | Why et al. | 348/375 |
| 2004/0189862 A1* | 9/2004 | Gustavsson et al. | 348/376 |

* cited by examiner

*Primary Examiner*—James M Hannett
(74) *Attorney, Agent, or Firm*—Ratner Prestia

(57) ABSTRACT

A compact flexible camera lens barrel designed for use with mobile telephones. The lens barrel may be used separately or in conjunction with a camera housing. The lens barrel is designed for use with a variety of different components including cover glass, cover plastics, flanges, gaskets and the like. The components do not affect the original z-height of the lens barrel.

24 Claims, 5 Drawing Sheets

FLEXIBLE CAMERA LENS BARREL

FIELD OF THE INVENTION

The invention relates to the field of photography and lenses, and more particularly to a flexible lens barrel for use with a mobile telephone.

BACKGROUND OF THE INVENTION

In today's market for camera and camera modules in mobile phones, customers have a variation of requests in design and construction. In particular, there are a number of requests regarding camera lens, housing and barrel design. Camera lens barrel design is important and has been a primary focus of manufacturers to provide flexibility in designs. Lens barrel design has evolved differently in various countries based on differing customer demands. For instance, the lens barrel design trends are different between Europe and Japan. Japanese customers often prefer a design in which there is not any protection on the camera module itself or integral to the cameral barrel since a cover plastic may be built into the phone housing to protect the lens from damage. This technique or camera barrel design has the advantage of allowing Japanese manufacturers to design thinner camera modules. In contrast, European manufacturers often prefer to have modules that provide better protection to their camera and camera lenses. For instance, these modules often add a thicker cover glass/plastic on top of the camera barrel and not the housing. This adds a thickness to the module and camera barrel often increasing the z-height. In addition, the European design also favors the use of a cover glass in place of a cover plastic to protect the lens.

There are three major camera barrel designs in use today with mobile phones. The first design includes a simple threaded barrel design. A cover plastic or glass must be used external to the barrel and increases the size or z-height of the module when it is assembled. This presents a problem in manufacturing and flexibility to the customer. For instance, if a customer purchases this design, he is often limited in his options of lens as well as covers that may be employed.

A second camera barrel design includes the use of a threaded barrel with a built in flange or gear for turning the lens during focusing. This design also provides a problem to manufacture and does not allow for ease of integration of a cover glass or cover plastic.

A third camera barrel design includes the use of a threaded barrel and gasket. Again this design suffers from a similar limitation in that the height of the camera barrel or module is affected if a cover glass or plastic is added to the design.

For these reasons, it is desired to provide a simple manufacture design that allows flexibility of camera barrel design for a variety of types of camera designs for use with mobile telephones. In addition, it would be desirable to provide a module or camera barrel design that is easy to manufacture, does not affect the overall camera z-height and which allows for quick and easy assembly and disassembly. These and other problems experienced by the art are obviated by the present invention.

SUMMARY OF THE INVENTION

The invention provides a flexible camera lens barrel. The flexible lens barrel comprises a top portion that comprises a first edge designed for receiving a component and a body portion joined to the top portion for attachment to the camera module, wherein the top portion and body portion define a fixed height and the component may join the top portion of the flexible lens barrel so as not to effect the height. The invention also provides a camera for a mobile telephone. The camera for the mobile telephone comprises a camera housing, a lens barrel attached to the camera housing and a lens for the lens barrel. The lens barrel comprises a top portion having a first edge designed for receiving a component and a body portion attached to the top portion, wherein the top portion and body portion define a fixed height and the component may join the top portion of the lens barrel so as not to effect the height.

BRIEF DESCRIPTION OF THE DRAWINGS

Embodiments of the invention will now be described with reference to the drawings, in which.

DETAILED DESCRIPTION OF THE INVENTION

Before describing the invention in detail, it must be noted that, as used in this specification and the appended claims, the singular forms "a," "an," and "the" include plural referents unless the context clearly dictates otherwise. Thus, for example, reference to "a lens barrel" includes more than one "lens barrel". Reference to a "gasket" or "flange" includes more than one "gasket" or "flange". In describing and claiming the present invention, the following terminology will be used in accordance with the definitions set out below.

The term "adjacent" or "adjacent to" refers to a component or element that is near, next to or adjoining. For instance, a flange may be adjacent to a cover glass.

All patents and other cited references are incorporated into this application by reference.

Figure 1A:
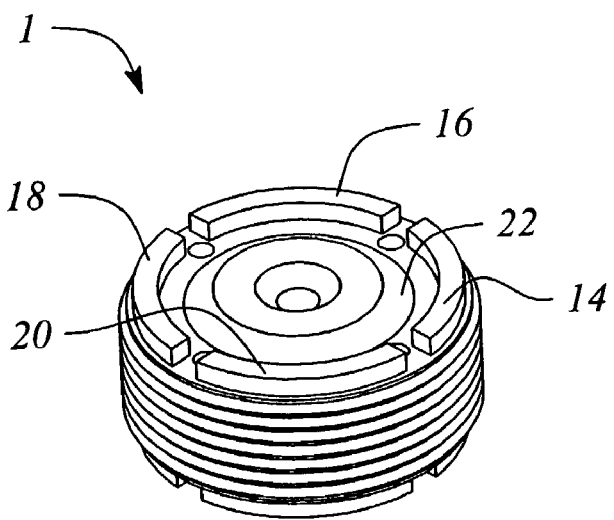
FIG. 1A illustrates a perspective view of the present invention.
Figure 1B:
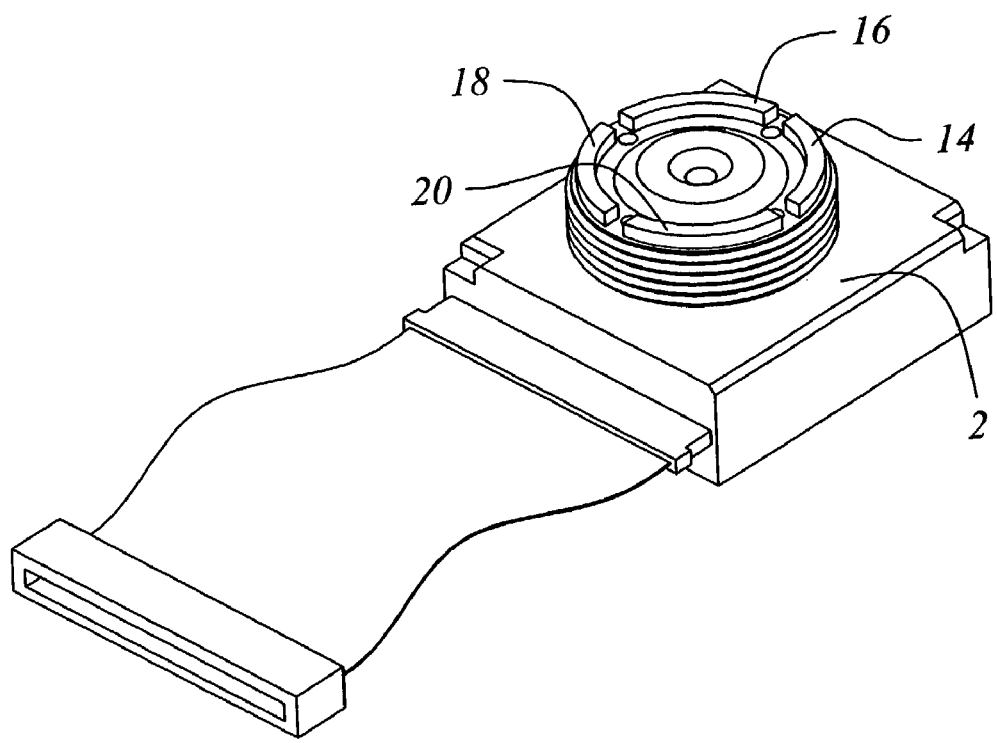
FIG. 1B illustrates a perspective view of the present invention in a camera module or housing.
Figure 2:
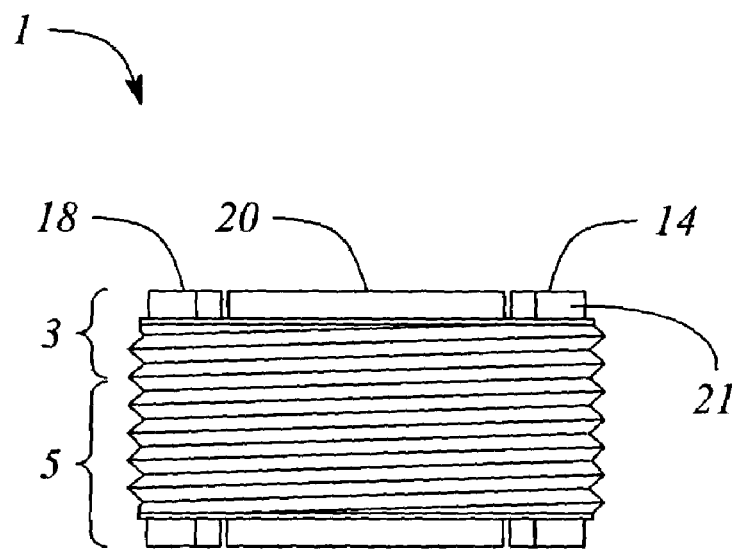
FIG. 2 is an enlarged cross sectional view of the present invention without the addition of components.
Figure 3:
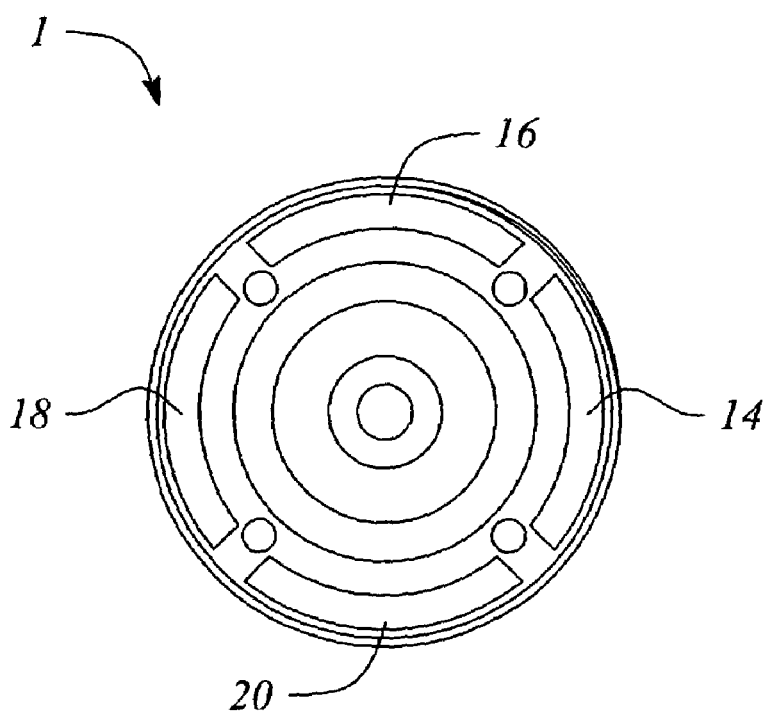
FIG. 3 is a plan view of the present invention.

Referring first to FIGS. 1-3, the flexible camera lens barrel 1 of the present invention can be designed in a variety of shapes, sizes and widths. The flexible camera lens barrel 1 can be used independently (See FIG. 1A) or in conjunction with a mobile telephone camera module or housing 2 (See FIG. 1B). FIGS. 1-3 show a flexible camera lens barrel 1 of the present invention without the addition of a component 7. The component 7 may comprise any of a number of parts that may be added to the design. For instance, the component 7 may comprise a cover glass 9, a cover plastic 10, a flange 11, a gasket 12 or other similar type devices or combination of devices known or used in the art. The component 7 may comprise other similar devices that operate similar in function to provide protection to a lens, move a lens, rotate a lens, associate parts or act as a spacer for a lens. The invention should not be interpreted to be limited to the described components. The flexible camera lens barrel 1 comprises a top portion 3 and a body portion 5 (See FIG. 2). The top portion 3 may comprise or be attached to the body portion 5. Optionally, the top portion 3 may also be detachable from the body portion 5. The top portion 3 may be designed in a variety of shapes and sizes and may comprise one or more threads 21. The threads 21 may be designed for attaching the component 7 to the flexible camera lens barrel 1 of the present invention. The body portion 5 may also comprise one or more threads 23 for attaching flexible camera lens barrel 1 to a camera module or housing 2 (See FIG. 1B). The flexible camera lens barrel 1 may be designed for receiving a component 7 (See FIG. 3). The flexible camera lens barrel 1 is designed to receive the component 7 wherein the top portion 3 and the body portion 5 define a fixed height 8 (z-height) that is not changed by the addition of the component 7. Therefore, the flexible camera lens barrel 1 does not change its z-height with the addition of the component 7. The height remains fixed even if the component 7 comprises a cover glass 9, cover plastic 10, flange 11 or gasket 12 (See FIGS. 4A, 5A, and 6A). The design of the flexible camera lens barrel 1 allows for the use or application of one or more of these components 7 without changing the design of the flexible lens barrel 1.

The top portion 3 of the present invention provides one or more edges designed for receiving a component 7. For instance, the top portion 3 may comprise a first edge 14 designed for receiving a component 7 (See FIGS. 1A and 3). Top portion 3, may also comprise a second edge 16, third edge 18 and/or fourth edge 20. The second edge 16 is adjacent to the first edge 14. The third edge 18 is adjacent to the second edge 16. The fourth edge 20 is adjacent to the third edge 18. The first edge 14, the second edge 16, the third edge 18 and the fourth edge 20 being designed to define a thread 21 or groove 22. The thread 21 may be used for attaching a component 7 to the top portion 3 of the flexible lens barrel 1. For instance, the component 7 may comprise flange 11 or gasket 12 or other similar type devices that rotate a camera lens or act as a spacer or seal. In addition, the groove 22 may be used for attaching a component 7 such as a cover glass 9 or cover plastic 10 to the top portion 3 of the flexible lens barrel 1. Other components 7 not described here but performing similar functions may also be employed with the present invention. The important criteria being that the component must be capable of alteration, adaption or design that does not affect the final z-height of the flexible lens barrel 1.

Figure 4A:
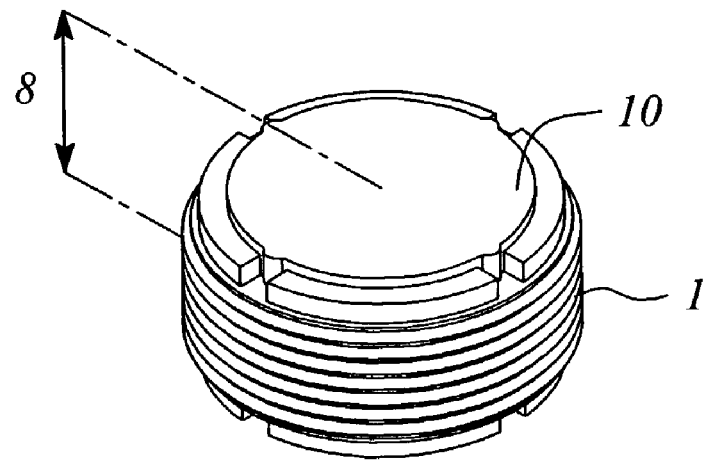
FIG. 4A is a perspective view of a first embodiment of the present invention in assembled format.
Figure 4B:
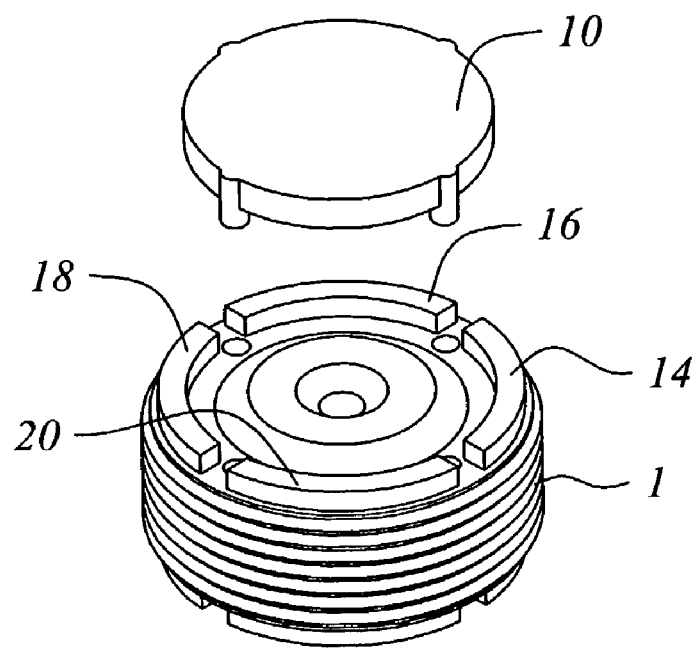
FIG. 4B is an exploded view of a first embodiment of the present invention.

FIGS. 4A and 4B show a second embodiment of the invention. In this embodiment of the invention, the flexible camera lens barrel 1 comprises a cover plastic 10. The cover plastic 10 is designed to fit into or on top portion 3 of the flexible camera lens barrel 1. FIG. 4A show the first embodiment in an assembled format. FIG. 4B shows an exploded view of the same embodiment of the invention.

Figure 5A:
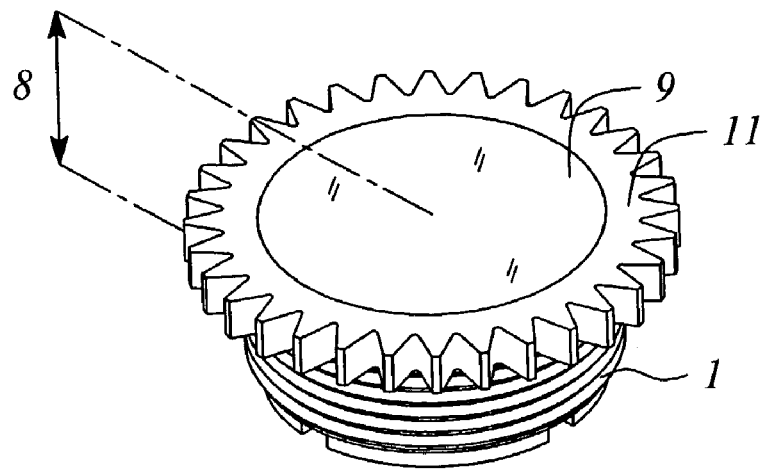
FIG. 5A is a perspective view of a second embodiment of the present invention in assembled format.
Figure 5B:
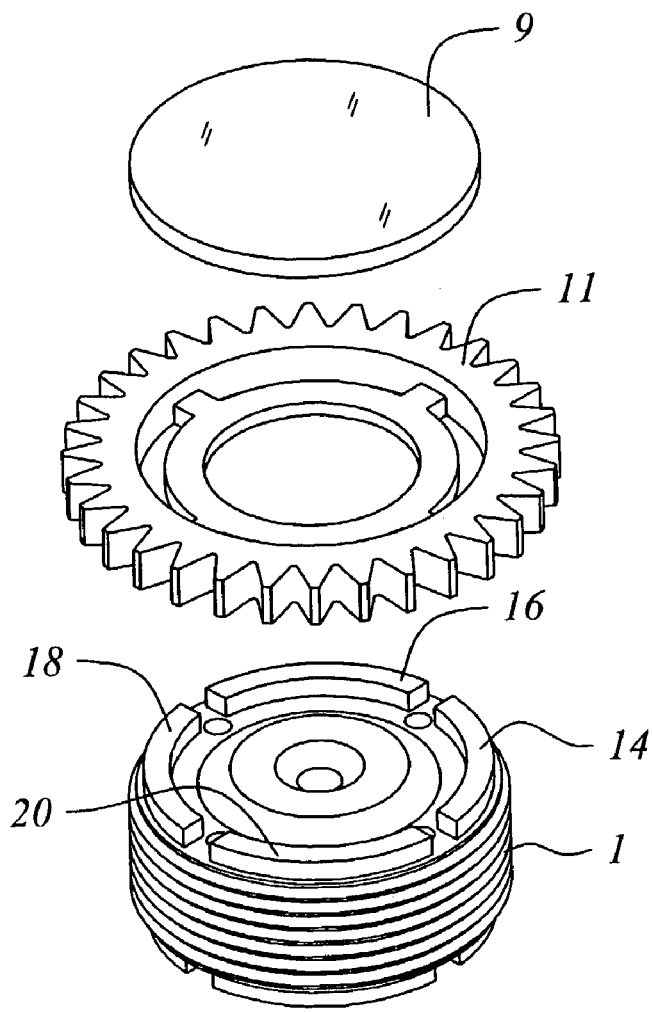
FIG. 5B is an exploded view of a second embodiment of the present invention.

FIGS. 5A and 5B show a third embodiment of the present invention. In this embodiment of the invention the same flexible lens barrel 1 is employed. However, in this case, the flexible lens barrel 1 is employed in conjunction with the flange 11 and the cover glass 9. The top portion 3 comprises the first edge 14, second edge 16, third edge 18 and the fourth edge 20 to define a thread 21. The thread 21 is design for attaching or receiving the flange 11. The cover glass 9 may then be inserted or attached to the flange 11. FIG. 5A shows the second embodiment in an assembled format. FIG. 5B shows an exploded view of the same embodiment of the invention.

Figure 6A:
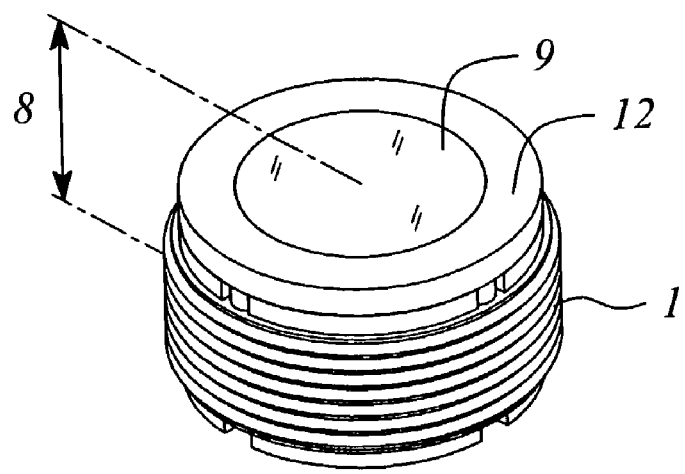
FIG. 6A is a perspective view of a third embodiment of the present invention in assembled format.
Figure 6B:
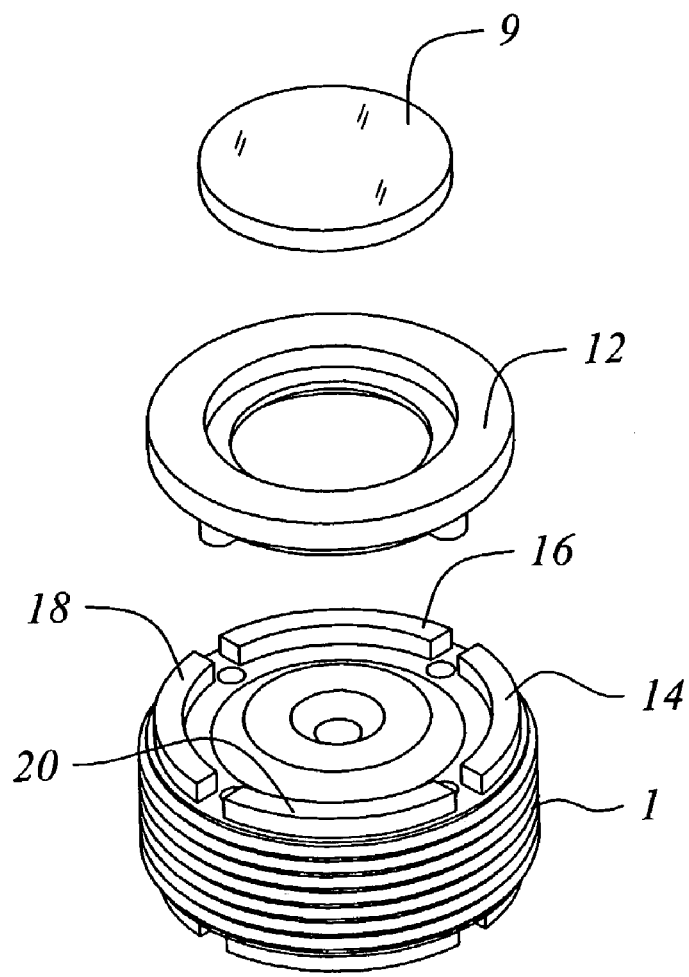
FIG. 6B is an exploded view of a third embodiment of the present invention.

FIGS. 6A and 6B show a fourth embodiment of the invention. In this embodiment of the invention, again the flexible camera lens barrel 1 is not changed in height. However, is this case the top portion 3 is designed for attaching or receiving a component 7 such as the gasket 12. The gasket 12 may fit in or be attached to the flexible camera lens barrel 1 by way of the first edge 14, second edge 16, third edge 18 and fourth edge 20. However, this is not required. FIG. 6A shows the third embodiment in an assembled format. FIG. 6B shows an exploded view of the same embodiment of the invention.

In each of the embodiments shown in FIGS. 4-6 it is clear that the fixed height or z-height 8 of the flexible camera lens barrel 1 has not been changed. Each figure shows the embodiment in assembled and exploded views.

Clearly, minor changes may be made in the form and construction of the invention without departing from the scope of the invention defined by the appended claims. It is not, however, desired to confine the invention to the exact form herein shown and described, but it is desired to include all such as properly come within the scope claimed.

We claim:

1. A flexible camera lens barrel, comprising:
   (a) a top portion comprising a top surface and a first edge protruding upwardly from the top surface and configured to receive a transparent component the first edge defining an upper-most region of a finished lens system including the lens barrel;
   (b) a body portion joined to a bottom surface of the top portion for attachment to a camera, wherein the top portion and the body portion define a fixed height of the lens barrel; and
   (c) the transparent component disposed over the top surface of the top portion so that a top surface of the transparent component is not above the first edge.

2. A flexible camera lens barrel as recited in claim 1, wherein the transparent component comprises a cover glass.

3. A flexible camera lens barrel as recited in claim 1, further comprising a flange configured to engage the top surface of the top portion of the lens barrel and including an aperture for receiving the transparent component.

4. A flexible camera lens barrel as recited in claim 1, further comprising a gasket configured to engage the top surface of the top portion of the lens barrel and including an aperture for receiving the transparent component.

5. A flexible camera lens barrel as recited in claim 1, wherein the top portion of the flexible camera lens barrel further comprises a second edge.

6. A flexible camera lens barrel as recited in claim 1, wherein the top portion of the flexible camera lens barrel further comprises a third edge.

7. A flexible camera lens barrel as recited in claim 1, wherein the top portion of the flexible camera lens barrel further comprises a fourth edge.

8. A flexible camera lens barrel as recited in claim 5, wherein the top portion of the flexible camera lens barrel further comprises a third edge.

9. A flexible camera lens barrel as recited in claim 8, wherein the top portion of the flexible camera lens barrel further comprises a fourth edge.

10. A flexible camera lens barrel as recited in claim 9, wherein the first edge is adjacent to the second edge, the second edge is adjacent to the third edge, and the third edge is adjacent to the fourth edge to define a thread for attaching a flange to the top portion of the flexible camera lens barrel, and the flange is configured to engage the top surface of the top portion of the lens barrel and includes an aperture for receiving the transparent component.

11. A flexible camera lens barrel as recited in claim 9, wherein the first edge is adjacent to the second edge, the second edge is adjacent to the third edge, and the third edge is adjacent to the fourth edge to define a groove for attaching a cover glass, as the transparent component, to the top portion of the flexible camera lens barrel.

12. A flexible camera lens barrel as recited in claim 9, wherein the first edge is adjacent to the second edge, the second edge is adjacent to the third edge, and the third edge is adjacent to the fourth edge to define a thread for receiving a gasket to the top portion of the flexible camera lens barrel and the gasket is configured to engage the top surface of the top portion of the lens barrel and includes an aperture for receiving the transparent component.

13. A camera for a mobile telephone, comprising:
   (a) a camera housing;
   (b) a lens barrel attached to the camera housing, the lens barrel comprising a top portion comprising a top surface and a first edge protruding upwardly from the top surface configured to receive a transparent component the first edge defining an upper-most region of a finished lens system including the lens barrel; and
   (c) a body portion attached to a bottom surface of the top portion, wherein the top portion and body portion define a fixed height of the lens barrel;
   (d) a lens disposed in the lens barrel; and
   (e) the transparent component disposed over the top portion so that a top surface of the transparent component is not above the first edge.

14. A flexible camera lens barrel as recited in claim 13, wherein the transparent component comprises a cover glass.

15. A flexible camera lens barrel as recited in claim 13, further comprising a flange configured to engage the top surface of the top portion of the lens barrel and including an aperture for receiving the transparent component.

16. A flexible camera lens barrel as recited in claim 13, further comprising a gasket configured to engage the top surface of the top portion of the lens barrel and including an aperture for receiving the transparent component.

17. A flexible camera lens barrel as recited in claim 13, wherein the top portion of the flexible camera lens barrel further comprises a second edge.

18. A flexible camera lens barrel as recited in claim 13, wherein the top portion of the flexible camera lens barrel further comprises a third edge.

19. A flexible camera lens barrel as recited in claim 13, wherein the top portion of the flexible camera lens barrel further comprises a fourth edge.

20. A flexible camera lens barrel as recited in claim 17, wherein the top portion of the flexible camera lens barrel further comprises a third edge.

21. A flexible camera lens barrel as recited in claim 20, wherein the top portion of the flexible camera lens barrel further comprises a fourth edge.

22. A flexible camera lens barrel as recited in claim 19, wherein the first edge is adjacent to the second edge, the second edge is adjacent to the third edge, and the third edge is adjacent to the fourth edge to define a thread for attaching a flange to the top portion of the flexible camera lens barrel, and the flange is configured to engage the top surface of the top portion of the lens barrel and includes an aperture for receiving the transparent component.

23. A flexible camera lens barrel as recited in claim 19, wherein the first edge is adjacent to the second edge, the second edge is adjacent to the third edge, and the third edge is adjacent to the fourth edge to define a groove for attaching a cover glass at the transparent component, to the top portion of the flexible camera lens barrel.

24. A flexible camera lens barrel as recited in claim 19, wherein the first edge is adjacent to the second edge, the second edge is adjacent to the third edge, and the third edge is adjacent to the fourth edge to define a thread for receiving a gasket to the top portion of the flexible camera lens barrel and the gasket is configured to engage the top surface of the top portion of the lens barrel and includes an aperture for receiving the transparent component.

* * * * *